(12) United States Patent
Duwe et al.

(10) Patent No.: US 7,014,392 B2
(45) Date of Patent: Mar. 21, 2006

(54) DEVICE FOR PNEUMATIC OR HYDRAULIC CONVEYING OF DUSTY, POWDERY OR GRANULAR BULK MATERIAL

(75) Inventors: Carsten Duwe, Hamburg (DE); Klaus Von Geldern, Hamburg (DE)

(73) Assignee: MOLLER Materials Handling GmbH, (DE)

( * ) Notice: Subject to any disclaimer, the term of this patent is extended or adjusted under 35 U.S.C. 154(b) by 58 days.

(21) Appl. No.: 10/690,913

(22) Filed: Jul. 10, 2003

(65) Prior Publication Data
US 2004/0071514 A1    Apr. 15, 2004

(30) Foreign Application Priority Data
Jul. 17, 2002   (DE) ................ 102 32 231

(51) Int. Cl.
B65G 53/52      (2006.01)
(52) U.S. Cl. ............... 406/95; 406/195; 406/181; 138/111; 138/113; 138/114
(58) Field of Classification Search ........... 406/95, 406/92, 195, 164–167, 181, 191; 138/111, 138/112, 113, 114
See application file for complete search history.

(56) References Cited

U.S. PATENT DOCUMENTS

| | | | | |
|---|---|---|---|---|
| 713,787 A | * | 11/1902 | McKone | 406/95 |
| 1,827,727 A | * | 10/1931 | Blizard | 138/37 |
| 1,930,782 A | * | 10/1933 | Turner | 165/95 |
| 2,661,194 A | * | 12/1953 | Katovsich | 366/11 |
| 3,240,531 A | * | 3/1966 | Lippert et al. | 406/50 |
| 3,253,865 A | * | 5/1966 | Kanics | 406/86 |
| 3,524,478 A | * | 8/1970 | Allenspach et al. | 138/111 |
| 3,558,195 A | * | 1/1971 | Kanics | 406/95 |
| 3,626,986 A | * | 12/1971 | Rapp et al. | 406/191 |
| 3,759,578 A | * | 9/1973 | Muschelknautz et al. | 406/95 |
| 3,782,452 A | * | 1/1974 | Cepton | 165/135 |
| 4,595,317 A | * | 6/1986 | Moller et al. | 406/95 |

FOREIGN PATENT DOCUMENTS

| | | |
|---|---|---|
| DE | 15 06 848 | 8/1969 |
| DE | 21 02 301 | 8/1972 |
| DE | 36 02 458 | 7/1987 |
| DE | 37 11 122 | 7/1988 |
| EP | 0 160 661 | 11/1985 |

* cited by examiner

*Primary Examiner*—Douglas Hess
(74) *Attorney, Agent, or Firm*—Wall Marjama & Bilinski LLP

(57) ABSTRACT

The present invention is directed to a device for pneumatic or hydraulic conveying of dusty, powdery or granular bulk material. The device includes a conveyor line, an inner pipe in the conveyor line that is parallel to the axis and preferably eccentric. The inner pipe has openings at intervals and flow resistors within itself, which have an upstream side plane and a downstream side plane in the region of the openings. As a result, outlet openings into the conveyor line and entrance openings into the inner pipe are formed for the conveying medium, characterized in that the upstream side plane forms an angle ($\alpha$)<90° with the axis (14) of the inner pipe (2) and deflects the striking conveying stream towards the outlet opening (20, 20a, 20b).

17 Claims, 3 Drawing Sheets

DEVICE FOR PNEUMATIC OR HYDRAULIC CONVEYING OF DUSTY, POWDERY OR GRANULAR BULK MATERIAL

BACKGROUND OF THE INVENTION

1. Field of the Invention

The present invention relates generally to bulk material conveyors, and particularly to a device for pneumatic or hydraulic conveying of dusty, powdery or granular bulk material.

2. Technical Background

In one approach that has been considered, a bypass line is disposed parallel to a main conveyor line. The bypass line has entrance- and outlet openings, which are disposed in a distance to each other. Between the entrance- and outlet openings a locking of the bypass line is disposed, so that the conveying medium of the bypass line is passed into the main conveyor line, and out from the same into the bypass line again at intervals.

In another approach that has been considered, a bypass line is disposed inside of the main conveyor line. In the bypass line, outlet openings are formed by a first tongue, which is itself formed into the interior of the bypass line, being on the bottom side directed traversely against the conveying stream. Behind in the direction of flow, a second tongue is formed in the same direction for the formation of a re-entry opening. In this construction also, as well as in that one described above, it is intended to achieve a split-up by the supply of conveying air from the bypass line when material plugs sticking fast in the conveyor line are formed.

In yet another approach that has been considered, a vertically standing disk is disposed between an entrance and an outlet opening in an inner pipe that serves as a bypass line, the disk being provided with at least one opening. The opening may be formed by a circular hole or also by a slit. With the aid of this measure it shall be achieved that the bulk material in the conveyor line is permanently swirled as strongly so that no fast-sticking material plugs are formed at the outset. Even if that occurs, dissolution of the material plug is effected by the conveying medium (e.g., air) from the inner pipe.

SUMMARY OF THE INVENTION

The present invention addresses several needs. The present invention creates a device for pneumatic or hydraulic conveying of dusty, powdery or granular bulk material, in which the consumption of energy is reduced upon maintenance of the conveying function.

One aspect of the present invention is a device for pneumatic or hydraulic conveying of dusty, powdery or granular bulk material. The device includes a conveyor line, an inner pipe in the conveyor line that is parallel to the axis and preferably eccentric. The inner pipe has openings at intervals and flow resistors within itself, which have an upstream side plane and a downstream side plane in the region of the openings. As a result, outlet openings into the conveyor line and entrance openings into the inner pipe are formed for the conveying medium, characterized in that the upstream side plane forms an angle ($\alpha$)<90° with the axis (14) of the inner pipe (2) and deflects the striking conveying stream towards the outlet opening (20, 20$a$, 20$b$).

In the inventive device, the upstream side plane is formed traversely to the flow direction such that the striking conveying stream is deflected towards the outlet opening. The flow resistor is preferably formed by a disk or blind, which is not a condition for the function, however.

According to one embodiment of the invention, the upstream side plane and the flow resistor, respectively, can extend up to the approximately deepest point of the openings. Alternatively, the flow resistor can be significantly shorter and can possibly extend up to the axis of the inner pipe or can be even shorter.

According to one embodiment of the invention, the flow resistor can be provided with at least one opening, which is formed as a circular hole or as a slit.

In the inventive construction also, preferably one single continuous opening is formed in the inner pipe, which is subdivided into an entrance- and an outlet opening by the flow resistor. The outlet opening can be formed smaller, equal to or larger than the entrance opening.

According to another embodiment of the invention, an angular incision into the inner pipe is formed in the region of the flow resistor, by which an outlet- and an entrance opening is formed. According to the invention, the point of the incision angle is located in the region of the flow resistor or the disk, respectively.

According to another embodiment of the invention, the point of the incision angle can be located approximately on the axis (14) of the inner pipe (2) in a distance to the downstream side plane.

The angles of the legs of the incision angle to the triangle side or hypotenuse, respectively, connecting the ends of the legs, may be selected in a suitable manner. They are preferably or even inevitably smaller than 90°.

According to another embodiment of the invention, the inner pipe sits closely to the inner wall of the conveyor line. According to another embodiment of the invention, the inner pipe has a distance to the wall of the conveyor line. By this, the conveyor cross section which is available for the bulk material is somewhat reduced in fact, but on the other hand, flow conditions are obtained through this which prevent any clogging or the formation of material plugs, respectively.

As already mentioned, the flow resistor can preferably be formed by a flat disk, which is attached in the inner pipe in a suitable manner, e.g. by welding together. According to one embodiment, the disk can be formed by a complete ellipse, or also by an ellipse segment. Upon traverse position of the disk in a circular inner pipe, the elliptic form is obligatory in its upper region, when it is intended that the disk shall sit closely to the wall of the inner pipe at least in the upper region. On the lower edge, the form can be designed otherwise, for instance a straight edge can be provided or a incision of limited width, which is provided from out the lower edge.

In the inventive form of a conveying device, a relatively smooth deflection of the conveying stream is achieved, by which less turbulences are caused. On the other hand, the amount that can flow back into the conveyor line is maximized by the flow resistor. Altogether, a construction is obtained which with at least equal conveying capacity requires a reduced energy consumption, with respect to conventional conveying devices and undisturbed conveying operation. As the energy consumption is considerable in such conveying devices, a considerable saving takes place.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
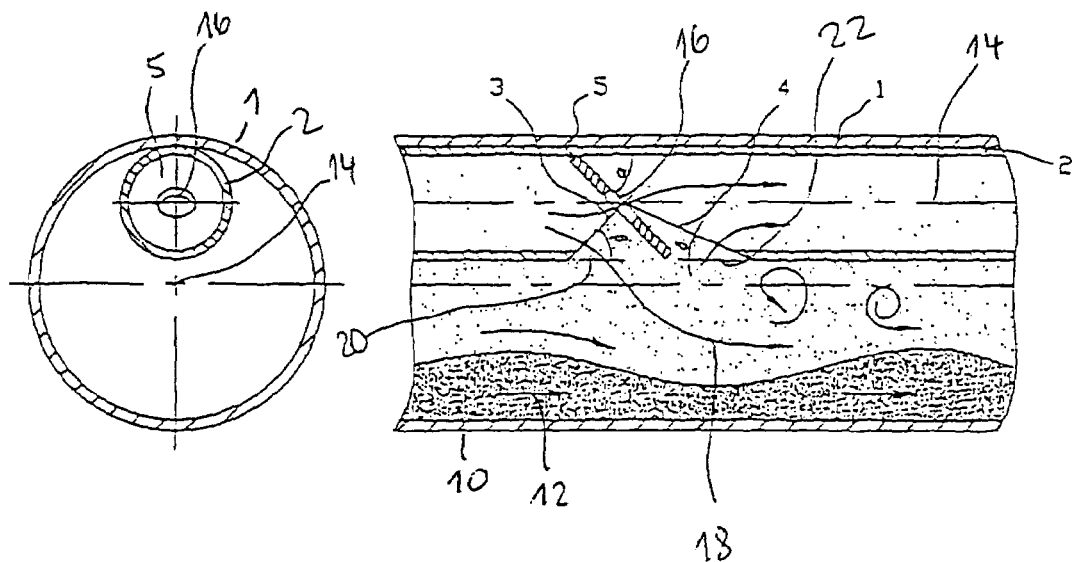
FIG. 1 shows a cross section and a longitudinal section through a part of a conveyor line according to the invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the conveyor line of the present invention is shown in FIG. 1, and is designated generally throughout by reference numeral 1.

In FIG. 1 a conveyor line 1 of a circular cross section can be recognized, as is conventionally used in pneumatic or hydraulic conveying devices. The material which is to be conveyed is represented at 10. It is moved forward by a conveying stream in the direction of the arrows 12, a part of the conveying cross section remaining free of bulk material, at all events hovering particles being situated above the proper bulk material (10) moved forward on the bottom of the conveyor line 1. In the cross sectional representation in FIG. 1, the bulk material is not shown.

An inner pipe 2 of circular cross section, but significantly smaller diameter sits closely on the upper side of the inner wall of the conveyor line 1. The inner pipe 2 is charged with the conveying medium in the same manner as the conveyor line 1. The inner pipe 2 has angular-shaped incisions at intervals, one of which is represented in FIG. 1. The incisions form legs 3 and 4 of an incision angle, the point of which is located on the axis of the inner pipe 2.

In the inner pipe 2, a flow resistor in the form of an elliptic disk 5 is represented, which has a central opening 16 of circular perimeter. The cross section can be also elliptic, however. As is recognizable, the point of the legs 3,4 is located in the center of the disk 5. The disk 5 has an upstream side and a downstream side plane. The upstream side plane and the overall disk 5 are inclined towards the axis of the inner pipe 14 such that the flow is deflected transversely downward into the direction of the opening of the incision, as is demonstrated by arrow 18. Thus, an outlet opening 20 and an entrance opening 22 for the conveying medium is formed by the disk 5 and the incision.

The angle β which is formed between the leg 3 and the triangle side or hypotenuse, respectively, connecting the legs 3, 4, is smaller than 90° and somewhat larger than the angle δ, which is formed between the leg 4 and the triangle side or hypotenuse, respectively. Thus, the lower edge of the disk 5 additionally subdividing the mentioned hypotenuse into a larger and a smaller portion, the outlet opening 20 is larger than the entrance opening 22.

Only in the case of a clogging, a more or less strong backflow of the conveying medium entering from the inner pipe 2 into the main conveyor line takes place, whereas in the normal operation without clogging the largest portion continues to flow in the main conveyor line. Thus, because the deflection of this conveying stream into the main conveyor line takes place in a relatively smooth fashion, and a rather large cross section of stream is also present between the inner pipe 2 and the interior of the main conveyor line 1, the flow resistance in this region is relatively small in the normal operation. On the other hand, a relatively large amount of conveying medium can leak out from the inner pipe into the conveyor line if the region of a possible clogging, in order to effectively dissolve a plug here.

Figure 2:
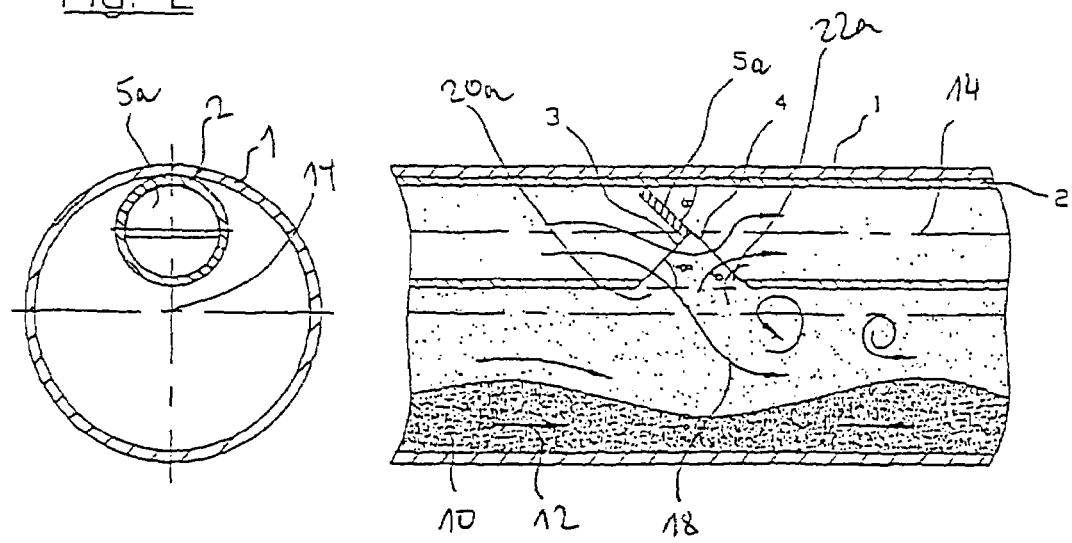
FIG. 2 shows a cross section and a longitudinal section through a second embodiment of a conveyor line according to the invention.

In the embodiment according to FIG. 2, an elliptic segment 5a is provided as a flow resistor, which is inclined with an angle α with respect to the axis 14, in the same manner as the disk 5 in FIG. 1. The peculiarity is that the segment 5a extends only up to shortly below the axis 14. The legs of the incision 3,4 form a right angle as a result of which the angles β and δ are equal. The lower end is on the half length of the hypotenuse. Through this, equal cross sections are obtained for the entrance- and the outlet opening 20a, 22a.

Figure 3:
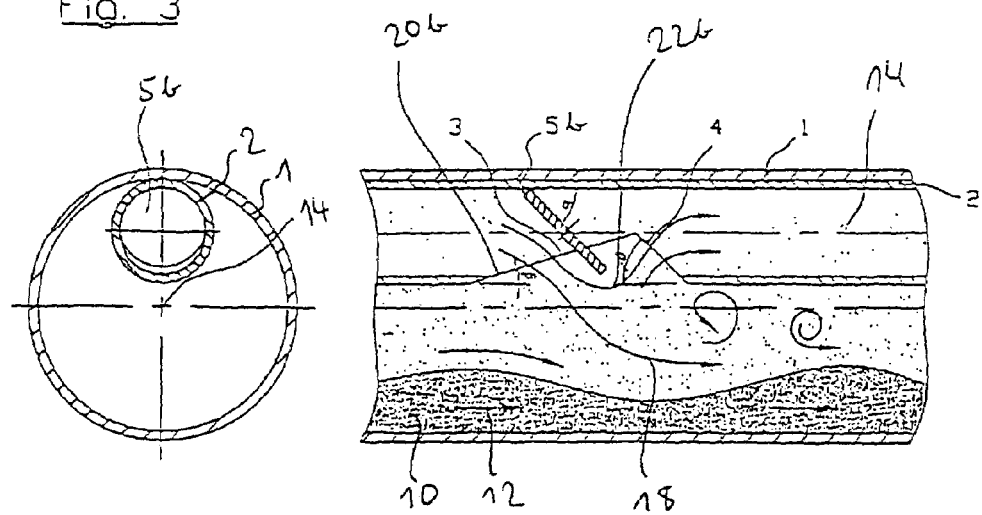
FIG. 3 shows a cross section and a longitudinal section through a third embodiment of a conveyor line according to the invention.

In the embodiment according to FIG. 3, a closed disk 5b is provided instead of a disk 5 with opening 16 according to FIG. 1. Whereas the disk 5 according to FIG. 1 extends approximately up to the lower outer side of the inner pipe 2, the closed disk 5b ends above the inner wall of the inner pope 2. Again, the inclination a corresponds to that one of the disks 5 and 5a of the preceding figures.

The incision with the legs 3 and 4 results in a point, which indeed can be situated on the axis 14 of the inner pipe 2, but is disposed in a distance with respect to the disk 5b on the downstream side. Through this, a relatively small angle α and a somewhat larger angle δ result. In this way, the cross section of flow is particularly large for the outlet opening 20b.

It should still be noted that the profile of the disk 5b inside the inner pipe is elliptic, but can take each other form of a turbulence generator on the outside to all intents.

Figure 4:
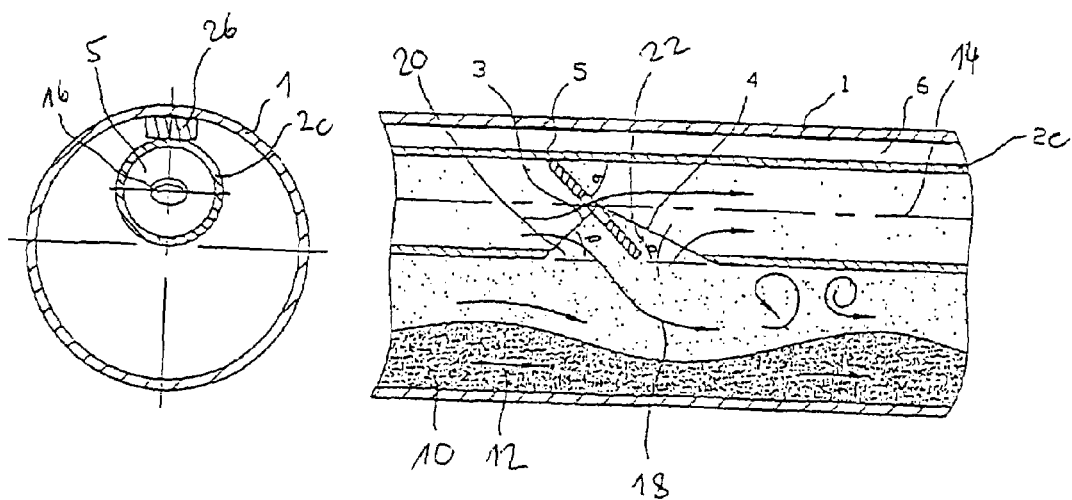
FIG. 4 shows a cross section and a longitudinal section through a fourth embodiment of a conveyor line according to the invention.

The embodiment according to FIG. 4 differs from that one according to FIG. 1 in that the inner pipe 2c has a distance 6 to the inner wall of the conveyor line 1. In FIG. 4 a distance piece is provided at 26, which is disposed in distances between conveyor line 1 and inner pipe 2c.

Figure 5:
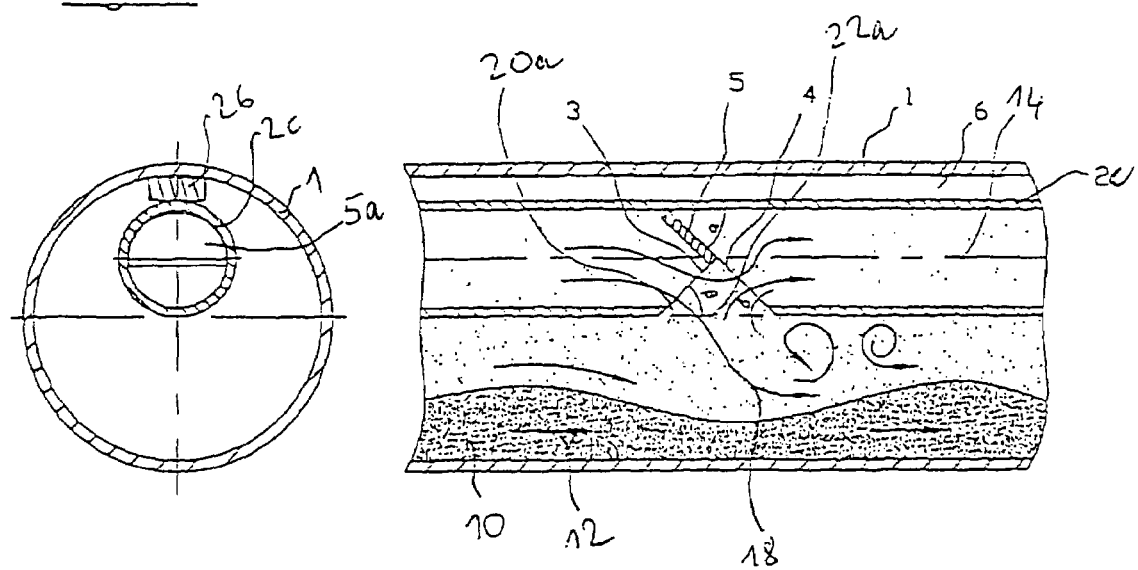
FIG. 5 shows a cross section and a longitudinal section through a fifth embodiment of a conveyor line according to the invention.

The embodiment according to FIG. 5 resembles to that one according to FIG. 2, a distance 6 being again provided between inner pipe 2c and conveyor line 1.

Figure 6:
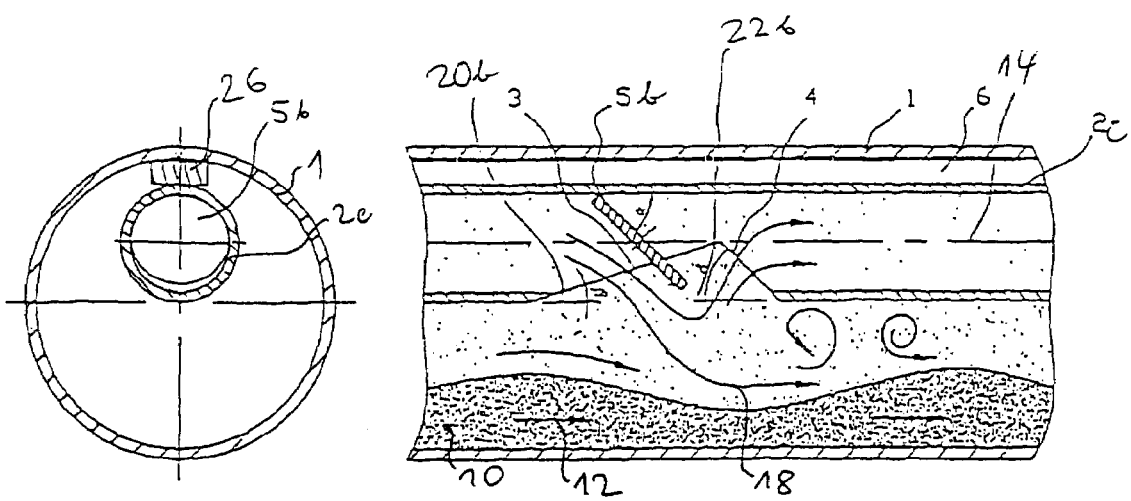
FIG. 6 shows a cross section and a longitudinal section through a sixth embodiment of a conveyor line according to the invention.

The embodiment according to FIG. 6 differs from that one according to FIG. 3 in that a distance 6 is provided between inner pipe 2c and conveyor line 1.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A device for pneumatic or hydraulic conveying of dusty, powdery or granular bulk material by a conveying medium in a conveyor line having an upper and a lower portion, the device comprising:

an inner pipe within the conveyor line having a longitudinal axis and extending eccentrically and axially parallel to the conveyor line in the upper portion of the conveyor line, said inner pipe having a circular cross section and lower openings at axially spaced intervals; and flow resistance disks disposed within the inner pipe, said flow resistance disks each having a circumference which is at least partially defined as elliptical, each flow resistance disk being disposed in the area of an opening and attached to the inner wall of the inner pipe, said flow resistance disks each having an upstream and a downstream surface such that an outlet opening for the inner pipe into the conveyor line and an inlet opening from the conveyor line into the inner pipe for conveying medium are defined, said flow resistance disks each being in engagement with the inner wall of the inner pipe by their elliptical circumference, the upstream surface of the disks forming an angle ($\alpha$) of <90° with respect to the longitudinal axis of the inner pipe and diverting the conveying medium to the outlet opening.

2. The device of claim 1, wherein the upstream surface of the disks extends down to the respective opening or beyond the opening into the conveyor line.

3. The device of claim 1, wherein the disks have at least one of a circular and slit-shaped aperture.

4. The device of claim 3, wherein the aperture is located on the longitudinal axis of the inner pipe.

5. The device of claim 1, wherein the upstream surface of the disks ends above the associated opening.

6. The device of claim 1, wherein the upstream surface of the disks ends at the longitudinal axis of the inner pipe or at a position below the axis.

7. The device of claim 1, wherein the outlet opening is at least one of smaller, equal to and larger than the inlet opening.

8. The device of claim 1, wherein the openings in the inner pipe are formed by an angular cut of the inner wall of the inner pipe.

9. The device of claim 8, wherein the cut extends upwardly at least one of above and below the longitudinal axis of the inner pipe.

10. The device of claim 8, wherein the legs of the angle of the cuts intersect in the region of the disks.

11. The device of claim 8, wherein the legs of the cuts intersect on the longitudinal axis of the inner pipe spaced from the downstream surface of the associated disk.

12. The device of claim 11, wherein the upstream leg of the angles from an angle ($\beta$)<90° with respect to the hypotenuse connecting to the other end of the legs.

13. The device of claim 11, wherein the angle ($\beta$) of the cuts is smaller, equal or larger than the angle ($\delta$), said angle being defined by the downstream leg of the cut angle and the hypotenuse connecting the remaining legs of the angle.

14. The device of claim 1, wherein the inner pipe is closely positioned to the inner wall of the conveyor line.

15. The device of claim 1, wherein the inner pipe is based from the inner wall of the conveyor line.

16. The device of claim 1, wherein the disks are wholly elliptically shaped.

17. The device of claim 1, wherein the disks are formed by a segment of an ellipse.

* * * * *

UNITED STATES PATENT AND TRADEMARK OFFICE
CERTIFICATE OF CORRECTION

| | | |
|---|---|---|
| PATENT NO. | : 7,014,392 B2 | Page 1 of 1 |
| APPLICATION NO. | : 10/690913 | |
| DATED | : March 21, 2006 | |
| INVENTOR(S) | : Carsten Duwe and Klaus Von Geldern | |

It is certified that error appears in the above-identified patent and that said Letters Patent is hereby corrected as shown below:

Column 4, Line 42.  Delete "pope" and replace with --pipe--.

Signed and Sealed this

Eighth Day of August, 2006

JON W. DUDAS
*Director of the United States Patent and Trademark Office*